UNITED STATES PATENT OFFICE.

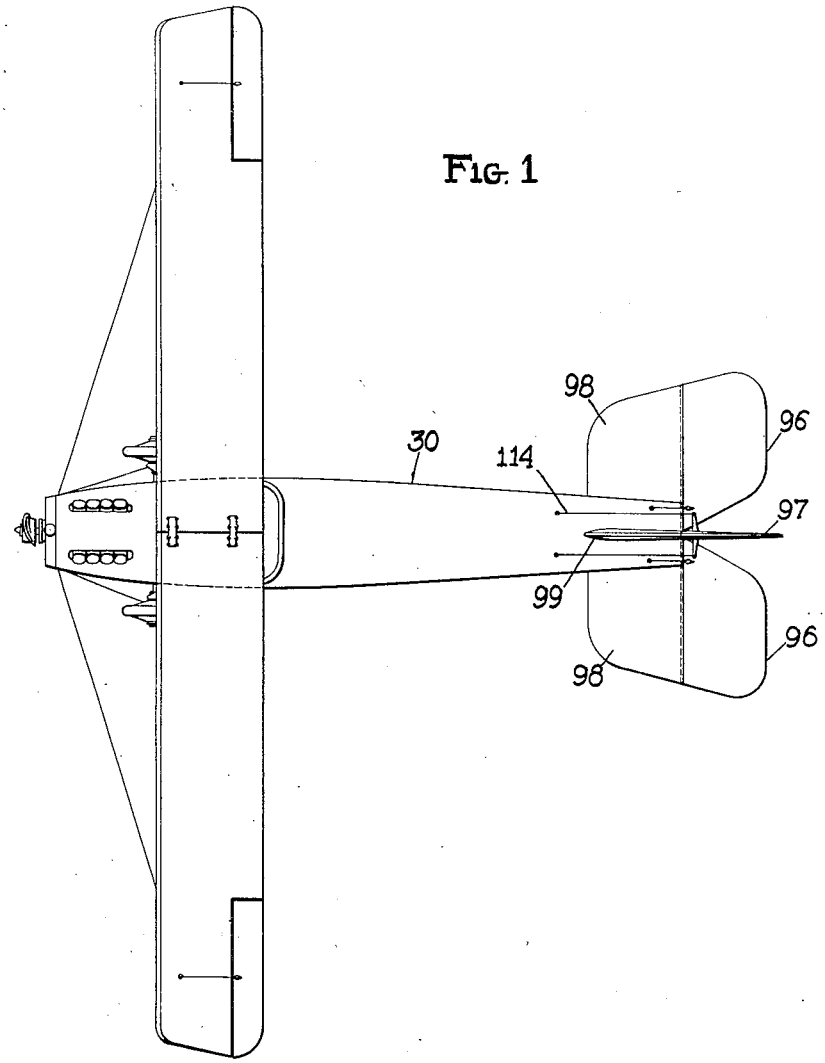

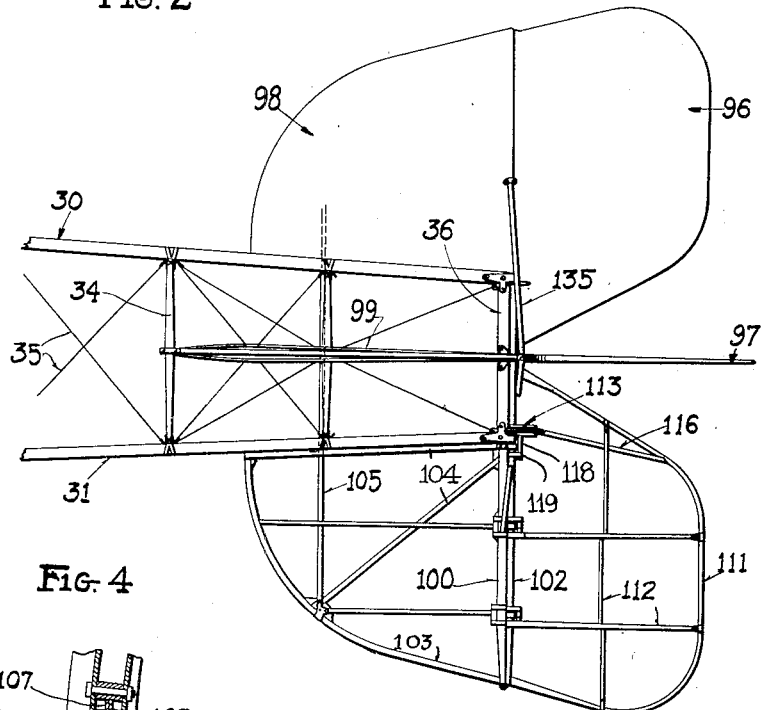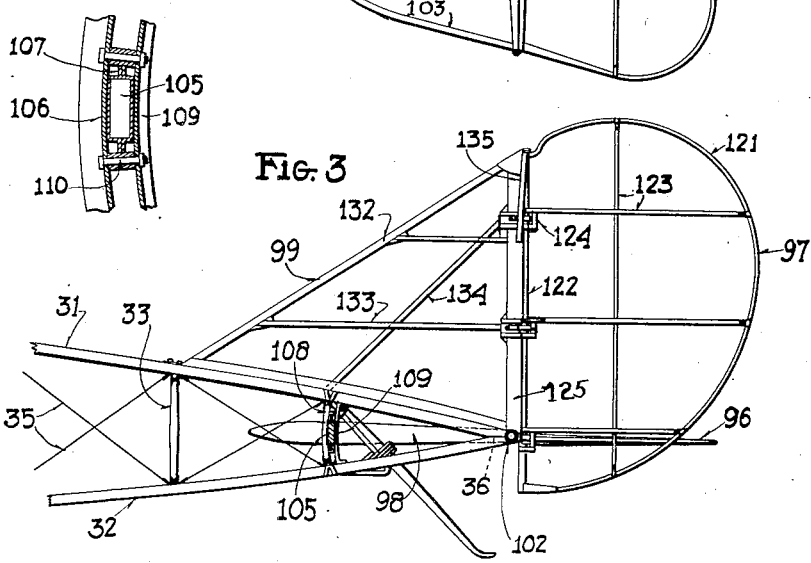

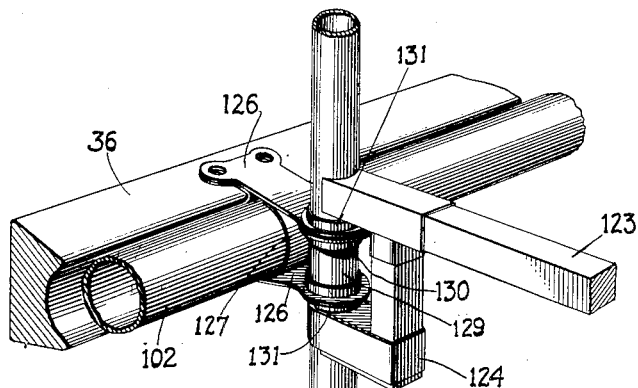
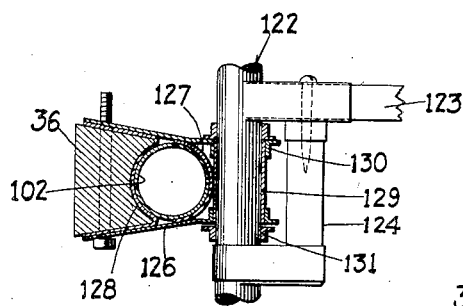
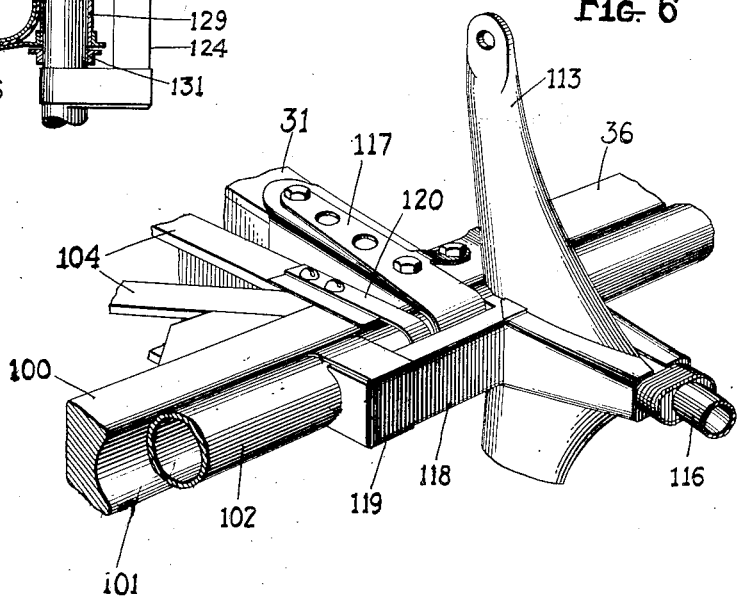

HENRY KLECKLER, OF HEMPSTEAD, NEW YORK, ASSIGNOR TO CURTISS AEROPLANE AND MOTOR CORPORATION, A CORPORATION OF NEW YORK.

AIRPLANE.

1,336,405.  Specification of Letters Patent.  Patented Apr. 6, 1920.

Original application filed February 8, 1917, Serial No. 147,414. Divided and this application filed May 31, 1918. Serial No. 237,437.

*To all whom it may concern:*

Be it known that I, HENRY KLECKLER, a citizen of the United States, residing at Hempstead, in the county of Nassau and State of New York, have invented certain new and useful Improvements in Airplanes, of which the following is a specification.

My invention relates to airplanes and more particularly to improvements in the steering mechanism thereof.

A characteristic of the invention is the arrangement and construction of the lever arms or horns of the control surfaces in a manner such that the actuating stresses set up in effecting control are adequately and perfectly distributed over a substantial portion of the control surface area without the use of the conventional stays or brace wires.

Another characteristic of the invention is the construction of the horizontal stabilizer. Instead of the conventional construction, one of the components of the horizontal stabilizer is extended directly through the tail of the fuselage or body of the craft whereby the sections of the stabilizer at opposite sides of the fuselage may be simultaneously adjusted to vary the angle of incidence of the stabilizer as a whole. The details of construction of the two-part or sectional stabilizer also embody certain novel features which will be hereinafter described and pointed out.

The invention is further characterized by an improved construction and arrangement of the control surfaces with respect to the aerofoil which they trail. The trailing edge of the fixed aerofoil surface or surfaces is longitudinally channeled or grooved. Within this groove the leading edge of the associated control surface is fitted. In this way head resistance is minimized and the control surfaces made substantial and uninterrupted continuations of the fixed surfaces of the craft.

By the use of the term "control surfaces" I include not only the elevator flaps but the ailerons as well for the constructional features characteristic of one of said surfaces are equally as well applicable to the other. By the use of the term "aerofoil" I desire to embrace any and all fixed surfaces such as the stabilizing fins and supporting surfaces or wings. In the preferred arrangement the elevator flaps trail the horizontal stabilizer, the rudder the vertical stabilizer and the ailerons the supporting surfaces or wings.

Of the drawings, wherein like numerals of reference designate like or corresponding parts;

Figure 1 is a top plan view of an airplane characterized as herein set forth;

Fig. 2 is a top plan view of the empennage detailing the interior framework of one of the elevator flaps and a portion of the horizontal stabilizer;

Fig. 3 is a longitudinal sectional view of that portion of the craft illustrated in Fig. 2 detailing the interior framework of the rudder and vertical stabilizer;

Fig. 4 is a detail of the horizontal stabilizer adjusting means;

Fig. 5 is a detail perspective view of a combined elevator and rudder hinge;

Fig. 6 is a detail perspective view illustrating fragmentarily a portion of one of the elevator flaps, a portion of the tail end of the fuselage, a portion of the horizontal stabilizer, and the hinge connection for said flap; and Fig. 7 is a longitudinal vertical sectional view of the combined elevator and rudder hinge.

Such features of the machine as the general arrangement of the supporting surfaces, the constructional details of the landing gear, etc., constitute the subject matter of co-pending applications upon one of which this application is predicated. The last mentioned co-pending application Serial No. 147,414, was filed Feb. 8, 1917, and it is to be understood that this application is a division thereof. For this reason the novel features of the machine as a whole will be touched upon but generally and only the novel features and details of the steering mechanism disclosed specifically and in full.

The fuselage or body of the craft, designated in its entirety by the numeral 30 comprises the usual longerons 31 and 32, 31 designating the upper longerons and 32 the lower. Vertical and horizontal struts 33 and 34 together with cross arranged wires 35 interbrace the longerons and truss the fuselage throughout. From the forward end of the fuselage rearwardly the upper longerons 31 are bowed inwardly and downwardly and the lower longerons 32 inwardly and upwardly (see Figs. 2 and 3), the longerons at opposite sides of the fuselage intersecting at the tail end thereof. At said tail end the longerons are interconnected by a horizontally extending stern post 36.

Aft of and in line with the tail end of the fuselage, elevator flaps 96 are disposed. These flaps lie symmetrically at opposite sides of the fore and aft axis of the craft, the adjacent edges of the co-acting flaps defining an operating space for the rudder 97.

In advance of the directional control surfaces 96 and 97, stabilizing surfaces 98 and 99 are provided, the horizontal stabilizing surface 98 continuing the elevator flaps 96 forwardly and the vertical stabilizing surface 99 continuing the rudder 97 forwardly (see Figs. 2 and 3).

The horizontal stabilizer 98 is made up of separate sections arranged respectively symmetrically at opposite sides of the fuselage, said sections being rigidly united, after assembly, at a point interiorly of the fuselage tail. Opposed stabilizer beams 100 continue the stern post 36 laterally, the beams and the post being longitudinally grooved as indicated at 101 to receive in the groove a substantially complemental metal tube 102 hereinafter referred to as the elevator beam. Stabilizer frames 103, beams 100 and cross arranged ribs 104 constitute the framework of the stabilizing surface, one of said ribs, separately designated 105, of each section of the stabilizer continuing inwardly beyond the adjacent edges of said sections for interconnection within the tail portion of the fuselage. A metal sleeve 106 marginally flanged as indicated at 107 and arranged to inclose the abutting rib sections 105, is used as the rib fastening means.

To vary the angle of incidence of the horizontal stabilizer 98, said surface is made adjustable, the elevator beam 102 affording a pivot axis. The rearmost vertical fuselage struts 108 are of arcuate form to function conjointly with parallel and appropriately spaced guide strips 109 as guides for the connected rib sections 105. Through bolts 110 arranged respectively above and below the metal fastening 106 act as stops for the joined rib sections and as fastening means for the horizontal stabilizing surface. Adjustment of these stops or through bolts is effected in adjusting the angle of incidence of said surface. The elevator flaps 96 or rather the interior framework of each flap is constructed in much the usual manner and may be described as comprising a metal frame 111, a beam 102 and a plurality of cross arranged ribs 112. The horns 113 of the elevator flaps 96 are located intermediate the planes of the sides of the fuselage, preferably in the vicinity of the respective sides, and equidistantly spaced from the fore and aft axis of the craft, that the elevator leads 114 may extend forwardly and directly into the tail end of the fuselage for securement interiorly thereof to suitable control mechanism (not shown). This location of the horns 113 tends to distort the elevator flaps and might easily do so were a metal brace 116 omitted. This brace, however, extends diagonally, laterally and rearwardly from the horn 113, thus distributing the operating strains uniformly or nearly uniformly throughout the flap. Said brace 116, in each instance, is enlarged at its inner end and integrally united to the elevator horn 113 associated with the flap of which said brace forms a part. Said horns are of a streamline form in cross section, the cross sectional area increasing rather shaply toward its base. The parts 102 and 113 are brazed together as are also the parts 102 and 119.

Hinge plates 117 are provided at the tail end of the fuselage to hingedly fasten the elevator beam 102 in place. Said hinges are of substantially U-form with the bight of the U embracing the beam 102 and the extensions overlapping the longerons at their rearward end.

A framing 118 of peculiar construction is provided at the base of the horns 113 of the elevator, said framing increasing considerably the point of attachment of the diagonal brace 116 of each flap and at the same time preventing lateral displacement of said flaps with respect to the fuselage tail. A band 119 is provided at the outer extremity of said framing 118 to embrace the elevator beam 102. Hinge plates 120 fastened to the opposed sections of the horizontal stabilizer 98 constitute the fastening means for said sections at their rearward inner ends. Moreover framings similar to the framing 118 are provided at the inner end of each longitudinally extending rib 112.

The rudder 97 comprises a frame 121, a rudder post 122 and crossed ribs 123, the inner terminal of each longitudinal rib 123 being enlarged as indicated at 124 by a construction similar to that disclosed in connection with the frame 118 of the elevator flaps. The rudder post 122 lies contiguous to a longitudinally grooved beam 125 hereinafter designated the vertical stabilizer beam. Said post 122, like the beam 102 is preferably constructed of metal tubing to complementally engage in the groove of the beam 125. The rudder at its lower end extends beyond the plane of the stern post 36.

Hinges for the rudder 97 are provided at intervals throughout its length, the hinges being in duplicate and of a form similar to the hinge plates 117 except the hinge at the intersection of the rudder with the elevator beam. This hinge serves a two fold purpose; first as a means for fastening the elevator beam 102 in abutting contact with the stern post 36 and secondly as a means for fastening the beam 122 of the rudder in contact with the vertical stabilizer beam 125. Said beam 125 is disposed rearwardly slightly beyond the plane of the beams 100 and the post 36. Preferably said combination hinge comprises opposed hinge plates 126, a retaining plate 127 (brazed to the plate 126) and a lining plate 128, the plate 127 partly encircling the beam 102 and the plate 128 underlying said beam to provide in effect a metal lined groove. The rudder post 122 is equipped with a bearing sleeve 129 against the terminals of which the plates 126 are fitted, said plates 126 being inwardly flanged as at 130, the flanges being annular and arranged to encircle the sleeve 129. Collars 131 prevent the vertical displacement of the rudder post. Furthermore, fastening means for the dual hinge, common to both the plates 126 and the plate 128, is provided.

The vertical stabilizer 99 comprises the usual frame 132, ribs 133 and interior brace 134, the brace 134 of the stabilizer disclosed being constructed of metal tubing and extended diagonally rearwardly from the top of the fuselage to the beam 125. Said stabilizer and the rudder 97 are braced additionally by means of lateral diagonal braces 135 arranged respectively at opposite sides of said surfaces, the braces engaging respectively the beam 125 at its outer end and the beams 100 at points laterally removed from the fuselage sides. Appropriate means may be provided for anchoring the stabilizer 99 to the horizontal struts of the fuselage.

Particular stress is laid upon the feature of so constructing the lever arms of the control surface that the use of stay wires is eliminated. By gradually widening or increasing the cross sectional area of the lever arm or arms at or near its or their connection with the control surface and integrally uniting the said arm or arms with one of the elements of the control surface framework, it is possible to so adequately and properly distribute the actuating stresses set up in effecting control that the use of said stay wires is unnecessary. The feature of channeling the trailing edge of one of the several surfaces to receive the complemental leading edge of the trailing or controlling surfaces is also important. This construction minimizes the head resistance during flight and permits of the installation of improved and simplified fastenings (see Figs. 5, 6 and 7).

While I have described my invention in detail in its present preferred embodiment, it will be obvious to those skilled in the art after understanding my invention that various changes and modifications may be made therein without departing from the spirit or scope thereof. I aim in the appended claims to cover all such modifications and changes.

What is claimed is:

1. In an airplane, directional control surfaces arranged symmetrically at opposite sides of the fore and aft axis of the craft, each of said surfaces including an interior brace outwardly and rearwardly extended from a point in the vicinity of the vertical plane of said axis, and operating means attached to said surfaces at the inner terminals of said interior braces for symmetrically distributing the operating stresses uniformly throughout said surfaces.

2. In an airplane, a body, a directional control surface, hinges for said surface secured to said body, horns for said surface located intermediate the planes of the sides of said body, and a means commonly reinforcing both the horn and hinge connections.

3. Airplane control mechanism including a control surface, a lever arm attached to the control surface, and a brace incorporated in the structure of the control surface, the brace and lever arm being of an integral construction whereby the stresses set up in the operating surface are uniformly distributed throughout a substantial portion of its total area.

4. Airplane control mechanism including a control surface, a metal brace incorporated in the structure of the control surface, a lever arm integrally united with the metal brace, the cross sectional area of the lever arm gradually increasing at its point of connection with said brace for effecting a strong connection and at the same time adequately distributing the operating stresses over a substantial portion of the area of said surface.

5. In an airplane, the combination with the rudder and the elevator or elevators, of a combination hinge comprising separate hinge plates fastened to the fuselage or body, a vertically disposed sleeve carried jointly by the hinge plates for the support of the rudder, and a horizontally disposed sleeve carried jointly by the hinge plates for the support of the elevator or elevators.

6. In an airplane, the combination with the rudder and the elevator or elevators, of a combination hinge, comprising separate hinge plates, fastened to the fuselage or body, a vertically disposed sleeve carried jointly by and between the hinge plates for the support of the rudder, and a horizontally disposed sleeve carried jointly by and between the hinge plates for the support of the elevator or elevators.

7. In an airplane, the combination with a rudder and an elevator flap, of a beam incorporated in the rudder structure, a beam incorporated in the elevator flap structure, and a combination hinge for both the rudder and the elevator flap, the hinge comprising plates mounted respectively above and beneath the elevator beam, said plates being provided with apertures through which the rudder beam passes, means carried by the plates for holding the elevator beam in place, a sleeve mounted on the rudder beam between the plates, and means for holding the rudder in operative position.

In testimony whereof I hereunto affix my signature.

HENRY KLECKLER.